US012598391B2

(12) United States Patent
Kawashima

(10) Patent No.: US 12,598,391 B2
(45) Date of Patent: Apr. 7, 2026

(54) OPTICAL INFORMATION READING APPARATUS AND OPTICAL INFORMATION READING METHOD

(71) Applicant: OPTOELECTRONICS CO., LTD., Saitama (JP)

(72) Inventor: Yasutake Kawashima, Saitama (JP)

(73) Assignee: OPTOELECTRONICS CO., LTD., Saitama (JP)

( * ) Notice: Subject to any disclaimer, the term of this patent is extended or adjusted under 35 U.S.C. 154(b) by 205 days.

(21) Appl. No.: 18/360,282

(22) Filed: Jul. 27, 2023

(65) Prior Publication Data

US 2025/0039552 A1 Jan. 30, 2025

(51) Int. Cl.
*H04N 23/73* (2023.01)
*H04N 23/74* (2023.01)

(52) U.S. Cl.
CPC ............ *H04N 23/73* (2023.01); *H04N 23/74* (2023.01)

(58) Field of Classification Search
CPC .... H04N 23/73; H04N 23/74; G06K 7/10732; G06K 7/10722; G06K 7/10742; G06K 7/10752
USPC .......................................... 348/362; 235/462
See application file for complete search history.

(56) References Cited

U.S. PATENT DOCUMENTS

| | | | |
|---|---|---|---|
| 7,234,641 | B2 | 6/2007 | Olmstead |
| 8,902,353 | B2 | 12/2014 | Fjellstad et al. |
| 9,659,199 | B2 | 5/2017 | Van Volkinburg et al. |
| 2006/0113386 | A1 | 6/2006 | Olmstead |
| 2012/0193429 | A1 | 8/2012 | Van Volkinburg |
| 2021/0133407 | A1 | 5/2021 | Kowalewski et al. |

FOREIGN PATENT DOCUMENTS

| | | | | |
|---|---|---|---|---|
| EP | 2482226 | A2 | 8/2012 | |
| EP | 2815351 | B1 * | 1/2017 | ........... G06K 7/1096 |
| JP | 2017-055396 | A | 3/2017 | |
| WO | 2012154801 | A1 | 11/2012 | |
| WO | WO-2020238826 | A1 * | 12/2020 | ............. H04N 23/74 |

OTHER PUBLICATIONS

Extended European Search Report from EP 23210066.9 mailed May 2, 2024, 7 pages.

* cited by examiner

*Primary Examiner* — Lin Ye
*Assistant Examiner* — Steven Daniel Barry
(74) *Attorney, Agent, or Firm* — Shih IP Law Group, PLLC

(57) ABSTRACT

An optical information reading apparatus includes: a light source; an imaging element configured to repeat a first exposure and a second exposure; and a control part configured to control the light source such that a gravity center of a light quantity of exposure illumination at a time of the first exposure and a gravity center of a light quantity of dummy illumination before and after the second exposure or before the second exposure are at an even time interval.

6 Claims, 7 Drawing Sheets

OPTICAL INFORMATION READING APPARATUS AND OPTICAL INFORMATION READING METHOD

TECHNICAL FIELD

The present disclosure relates to an optical information reading apparatus and an optical information reading method.

BACKGROUND ART

Optical information reading apparatuses such as code scanners are used to read optical codes such as one-dimensional codes and two-dimensional codes. Optical information reading apparatuses are widely used in various fields of goods management, position detection and the like.

One-dimensional codes, two-dimensional codes and the like that indicate information in the form of marks with a light reflectance different from the surrounding parts are used as optical codes, for example. The one-dimensional code is also called bar code, linear code and the like. The one-dimensional code uses lines with various widths linearly disposed side by side, and represents information about alphanumeric characters and the like by using the line portions and the blank portions. For example, the one-dimensional code represents a universal product code. The two-dimensional code is also called two-dimensional symbol and the like, and represents information by using the symbol disposed in vertical and horizontal directions. The two-dimensional code has a higher informatization density and can store more information than one-dimensional codes. A QR code (registered trademark) is a type of two-dimensional code.

CITATION LIST

Patent Literature

PTL 1
Japanese Patent Application Laid-Open No. 2017-55396
PTL 2
U.S. Pat. No. 9,659,199
PTL 3
U.S. Pat. No. 7,234,641
PTL 4
U.S. Pat. No. 8,902,353

SUMMARY OF INVENTION

Technical Problem

To read optical codes, some optical information reading apparatuses apply blinking light to the optical codes. A long interval of the blinking light may cause flicker in the human eye, and cause discomfort.

In view of this, an object of the present disclosure is to provide an optical information reading apparatus and an optical information reading method that can suppress flicker of light for reading optical codes.

Solution to Problem

An optical information reading apparatus according to the present disclosure includes: a light source; an imaging element configured to repeat a first exposure and a second exposure; and a control part configured to control the light source such that a gravity center of a light quantity of exposure illumination at a time of the first exposure and a gravity center of a light quantity of dummy illumination before and after the second exposure or before the second exposure are at an even time interval.

An optical information reading method according to the present disclosure includes: repeating a first exposure and a second exposure; and controlling a light source such that a gravity center of a light quantity of exposure illumination at a time of the first exposure and a gravity center of a light quantity of dummy illumination before and after the second exposure or before the second exposure are at an even time interval.

Advantageous Effects of Invention

According to the present disclosure, flicker of light for reading optical codes can be suppressed.

DESCRIPTION OF EMBODIMENTS

Embodiments of the present disclosure are elaborated below with reference to the drawings. Note that the present disclosure describes a case where a code scanner is used as an example of the optical information reading apparatus. The code scanner of the present disclosure may be used to read goods information of the goods purchased by the customer in a store and the like, for example. In addition, the code scanner of the present disclosure may be attached to a vehicle that travels on the path installed on the ceiling of a factory and the like to convey parts and the like, and used to read an optical code attached at a predetermined position, for example.

Exemplary Configuration of Code Scanner

Figure 1:
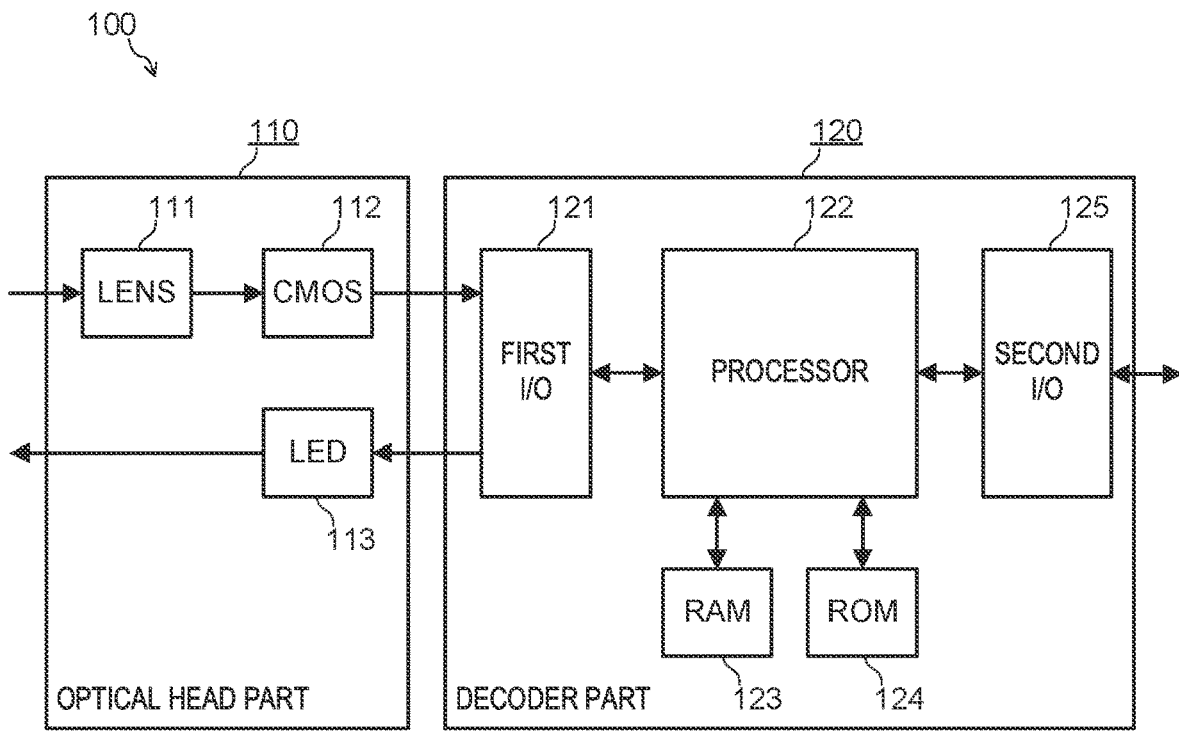
FIG. 1 is a diagram illustrating an exemplary schematic hardware configuration of a code scanner according to an embodiment of the present disclosure.

FIG. 1 is a diagram illustrating an exemplary schematic hardware configuration of code scanner 100 according to an embodiment of the present disclosure. Code scanner 100 is composed of optical head part 110, and decoder part 120. Optical head part 110 and decoder part 120 may be separate members, or may be integrated with each other.

Optical head part 110 includes lens 111, and CMOS (Complementary Metal Oxide Semiconductor) image sensor (hereinafter referred to as simply "CMOS") 112 as an example of the solid imaging element. In addition, optical head part 110 includes light-emitting diode (LED) 113 as an example of the light source.

Lens 111 is an optical lens, and takes the image of the reading object having the optical code into optical head part 110 to form an image on the image capturing area of CMOS 112, for example.

With the reflection light from the reading object taken by lens 111, CMOS 112 captures the image of the reading object, generates image data represented by digital luminance values from the analog image signal obtained through the image-capturing, and outputs the data to decoder part 120.

LED 113 emits light to illuminate the reading object. In this manner, CMOS 112 can capture clear images.

Decoder part 120 includes first input/output interface (first I/O) 121, processor 122, random access memory (RAM) 123, read only memory (ROM) 124, and second input/output interface (second I/O) 125.

First I/O 121 is an interface for data communication between optical head part 110 and decoder part 120. The image data output from CMOS 112 is input to processor 122 through first I/O 121.

Processor 122 is a central processing unit (CPU), for example. Processor 122 may be referred to as control part.

Processor 122 performs control of CMOS 112 and LED 113, filtering processing for noise removal for the image data input from CMOS 112 through first I/O 121, data processing for the preparation for decoding, decoding processing for optical codes included in the image data after the processing, and the like. Note that for the details of decoding processing, publicly known methods such as the method disclosed in Japanese Patent Application Laid-Open No. 2005-25417 may be employed, for example.

RAM 123 is a storage means for temporary storing the image data input from CMOS 112, serving as a working memory in data processing for the preparation for decoding, and storing dynamically changing data such as data required for other operations of code scanner 100. Note that a part of RAM 123 may be nonvolatile.

ROM 124 is a nonvolatile storage means that stores a program for activating code scanner 100 and the like.

Second I/O 125 is an interface for data communication between processor 122 and other apparatuses such as servers and vehicles. The decoded data information output from processor 122 is input to other apparatuses such as servers and vehicles through second I/O 125.

Analysis

When a code scanner (CMOS) reads an optical code, the light (illumination) output from the LED is applied to the optical code. If the light applied to the optical code is reflected in a specular manner by the optical code, the code scanner may not appropriately read the optical code.

In view of this, the code scanner detects the presence/absence of specular reflection of the light at the optical code by comparing the image of the optical code captured with the illumination (LED) turned on, and the image of the optical code captured with the illumination turned off.

Figure 2A:
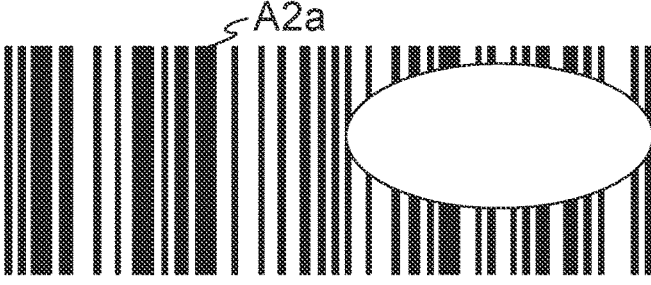
FIGS. 2A and 2B are diagrams illustrating an exemplary detection of specular reflection.
Figure 2B:
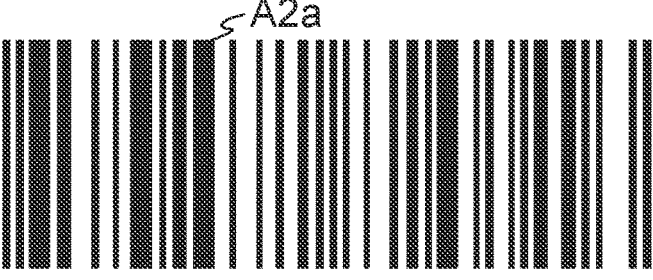

FIGS. 2A and 2B are diagrams illustrating an exemplary detection of specular reflection. FIG. 2A illustrates an image of optical code A2a captured by the code scanner with the illumination turned on. FIG. 2B illustrates an image of optical code A2b captured by the code scanner with the illumination turned off.

When specular reflection of the light occur at the optical code, a part of the image of optical code A2a is obscured due to the specular reflection as illustrated in FIG. 2A. In view of this, the code scanner detects specular reflection of the light at optical code A2a by comparing the image of optical code A2a obtained with the illumination turned on, and the image of optical code A2a obtained with the illumination turned off.

The time interval of the image-capturing of optical code A2a is required to be short. For example, if the interval of the image-capturing of optical code A2a is long, optical code A2a may not be captured due to the movement of the optical head part or optical code A2a when the illumination is turned off even when optical code A2a is captured when the illumination is turned on. In this case, the code scanner cannot detect the specular reflection of the light at optical code A2a. In view of this, it is conceivable to alternately execute the image-capturing with the illumination turned on and the image-capturing with the illumination turned off.

Figures 3A, 3B:
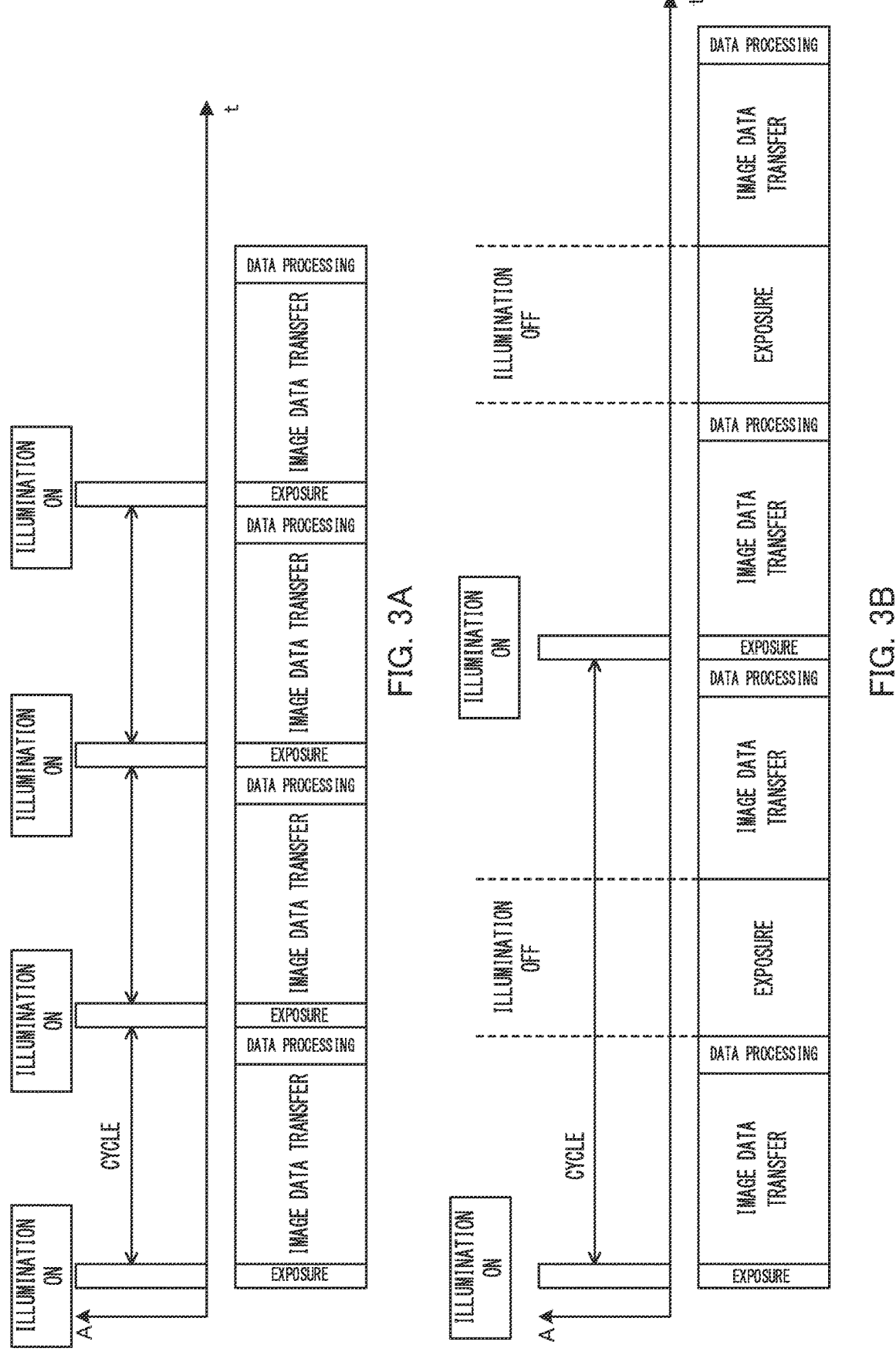
FIGS. 3A and 3B are diagrams illustrating an exemplary timing of illumination and image-capturing.

FIGS. 3A and 3B are diagrams illustrating an exemplary timing of illumination and exposure. FIG. 3A is a timing diagram of a case where illumination-on exposure is repeated. FIG. 3B is a timing diagram of a case where illumination-on exposure and illumination-off exposure are alternately repeated to detect specular reflection.

Note that in FIG. 3A, the presence/absence of specular reflection of the light at the optical code cannot be detected. FIG. 3A is illustrated for the purpose of comparison with the timing diagram of FIG. 3B.

The abscissa "t" in FIGS. 3A and 3B represents time. The ordinate "A" in FIGS. 3A and 3B represents light quantity. The "exposure" in FIGS. 3A and 3B represents the exposure time of CMOS. The "image data transfer" in FIGS. 3A and 3B represents the transferring time of the image data captured by the CMOS to the processor. The "data processing" in FIGS. 3A and 3B represents the image data processing time of the processor (for example, the decoding time of the optical code). The "illumination on" in FIGS. 3A and 3B represents the time (period) of illumination-on.

The frequency of "illumination on" illustrated in FIG. 3A is 60 Hz, for example. In this case, the blink of the illumination is difficult to capture in the human eye, and causes little discomfort.

On the other hand, when the "illumination off" exposure is inserted between the "illumination on" exposure and the next "illumination on" exposure for the purpose of detecting specular reflection of the light as illustrated in FIG. 3B, the interval (frequency) of the illumination-on becomes 60 Hz or less, for example. In this case, the blink of the illumination may be easily captured in the human eye, and may cause discomfort.

Figure 4:
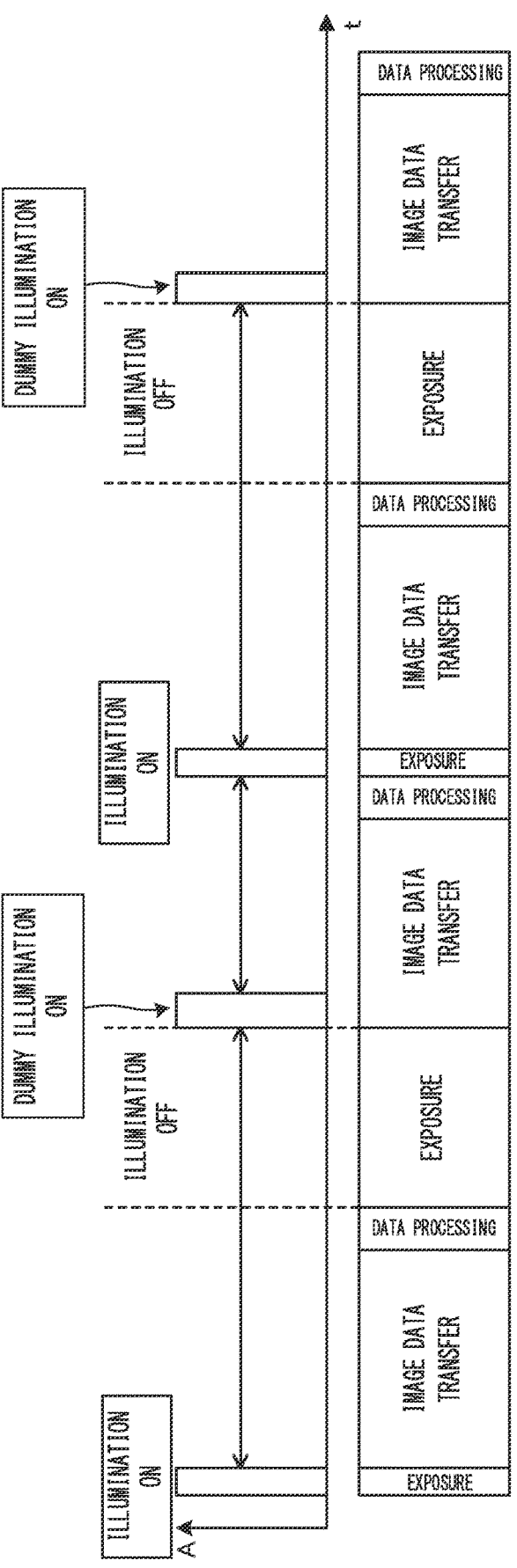
FIG. 4 is a diagram illustrating another exemplary timing of illumination and image-capturing.

FIG. 4 is a diagram illustrating another exemplary timing of illumination and exposure. In the timing diagram illustrated in FIG. 4, dummy illumination is turned on (see "dummy illumination on" in FIG. 4) after the "illumination off" exposure to reduce the blink of the illumination captured in the human eye in comparison with the timing diagram of FIG. 3B. As a result, the interval of the illumination-on in FIG. 4 is shorter than the interval of "illumination on" of FIG. 3B, and the blink of the illumination captured in the human eye is reduced.

However, in the timing diagram of FIG. 4, the intervals of the illumination-on (the intervals between "illumination on" and "dummy illumination on") are not even intervals, and consequently the illumination may flicker in the human eye, and cause discomfort.

In view of this, in the present disclosure, to reduce the unpleasant flicker in the human eye, the gravity center of the light quantity of the illumination that is turned on at the time of the exposure and the gravity center of the light quantity of the dummy illumination are controlled such that they are equal to each other in nominal tolerance.

Operation Example 1

Figure 5:
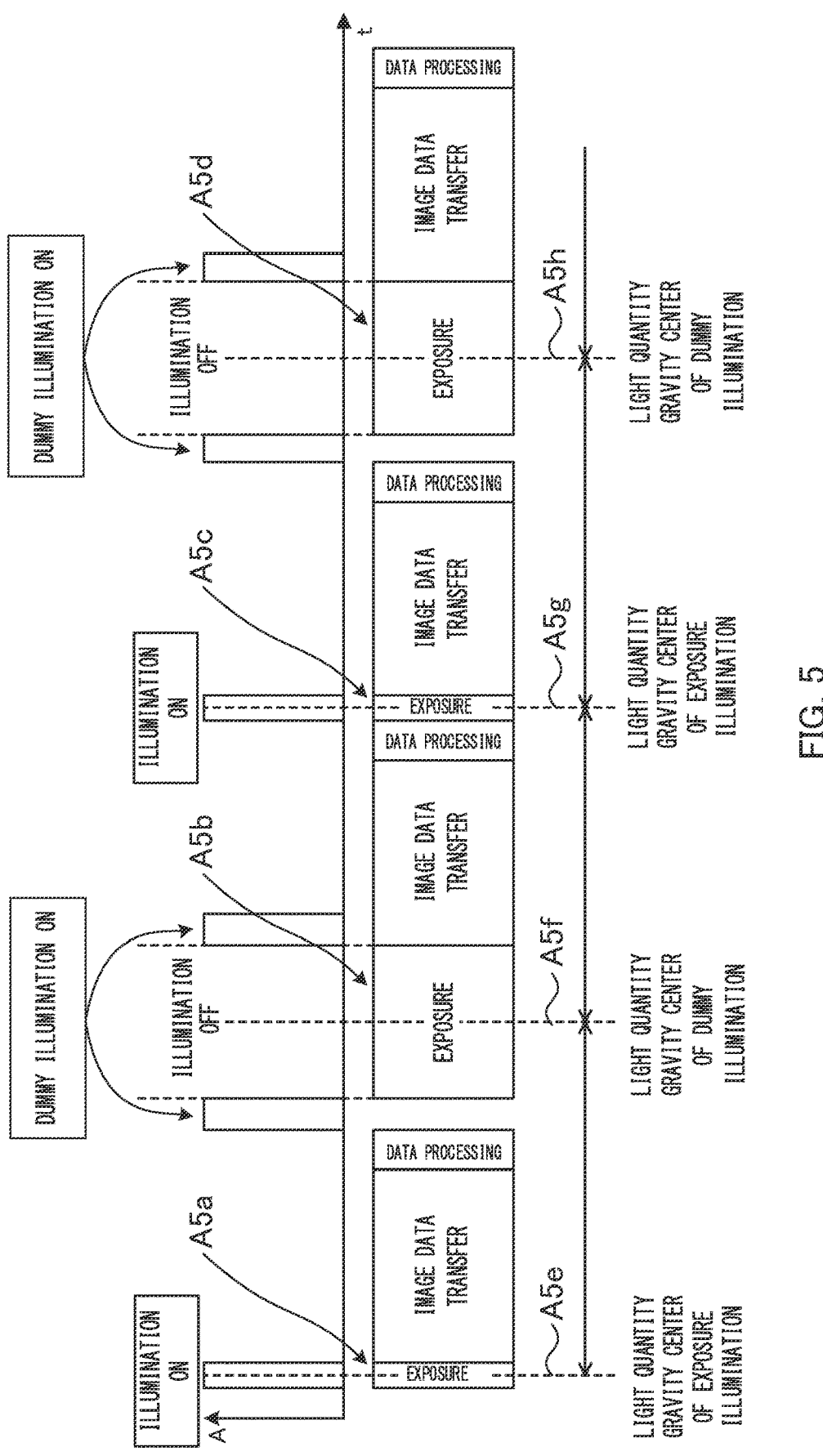
FIG. 5 is a diagram illustrating operation example 1 of the code scanner.

FIG. 5 is a diagram illustrating operation example 1 of code scanner 100. Code scanner 100 executes the exposure of CMOS 112 using the illumination (light) of LED 113 and the exposure of CMOS 112 not using illumination of LED 113 for the purpose of detecting specular reflection of the light.

For example, code scanner 100 executes the exposure of CMOS 112 using the illumination of LED 113 indicated by arrows A5a and A5c in FIG. 5, and the exposure of CMOS 112 not using the illumination of LED 113 indicated by arrows A5b and A5d in FIG. 5.

The exposure using the illumination can be regarded as exposure in which LED 113 is turned on at the time of the exposure of CMOS 112. The exposure not using the illumination can be regarded as exposure in which LED 113 is not turned on at the time of the exposure of CMOS 112.

In the following description, the exposure using the illumination may be referred to as illumination exposure. The exposure not using the illumination may be referred to as non-illumination exposure. In addition, the illumination that is turned on at the time of the exposure may be referred to as exposure illumination. The illumination that is turned on at the time other than the exposure may be referred to as dummy illumination.

The illumination exposure and the non-illumination exposure are alternately repeated at an interval as indicated by arrows A5a to A5d in FIG. 5. Code scanner 100 turns on the dummy illumination (see "dummy illumination on" in FIG. 5) between the illumination exposure and the non-illumination exposure and before and after the non-illumination exposure (see arrows A5b and A5d in FIG. 5).

Dotted lines A5e and A5g in FIG. 5 represent the gravity center of the light quantity of the exposure illumination. For example, in the case where the exposure illumination is emitted in a pulsed manner (square form) as indicated by "illumination on" in FIG. 5, the gravity center of the light quantity of the exposure illumination is the timing (time) that halves the area of the square.

Dotted lines A5f and A5h in FIG. 5 represent the gravity center of the light quantity of the dummy illumination. For example, as indicated by "dummy illumination on" in FIG. 5, in the case where the two dummy illuminations before and after the non-illumination exposure are pulsed with the same light quantity, the gravity center of the light quantity of the dummy illumination is the center timing of the two dummy illuminations before and after the non-illumination exposure.

Processor 122 controls the on time and light quantity of LED 113 such that the gravity center of the light quantity of the exposure illumination and the gravity center of the light quantity of the dummy illumination alternate at even time intervals (on the time axis). For example, processor 122 controls the on time and light quantity of the exposure illumination and the dummy illumination such that the interval of dotted lines A5e to A5h of FIG. 5 is an even interval.

It suffices to control the on time and light quantity of LED 113 such that the gravity center of the light quantity of the exposure illumination and the gravity center of the light quantity of the dummy illumination alternate at even intervals. Therefore, the interval of the exposure illumination and the dummy illumination may not be an even interval. For example, the interval of the squares indicated by the "illumination on" and "dummy illumination on" in FIG. 5 may not be an even interval.

As described above, processor 122 controls the on time and light quantity of LED 113 such that the gravity center of the light quantity of the exposure illumination and the gravity center of the light quantity of the dummy illumination alternate at even intervals. In this manner, even when the exposure illumination and the dummy illumination are not at even intervals, the flicker of the illumination captured in the human eye is suppressed, and discomfort is suppressed.

Note that processor 122 may control LED 113 such that the total amount of the light quantity of the exposure illumination and the total amount of the light quantity of the dummy illumination are equal to each other.

In addition, the time (on time) of the exposure illumination may be the same as the exposure time of CMOS 112 as illustrated in FIG. 5. In addition, the time of the exposure illumination may be shorter than the exposure time of CMOS 112 (for example, see "exposure illumination" in FIG. 8C). In addition, the time of the exposure illumination may be longer than the exposure time of CMOS 112.

In addition, two or more dummy illuminations may be provided before the non-illumination exposure, and two or more dummy illuminations may be provided after the non-illumination exposure. In this case, the flicker of the illumination is more suppressed. Note that the power consumption is suppressed in the case where one dummy illumination is provided before the non-illumination exposure and one dummy illumination is provided after the non-illumination exposure as illustrated in FIG. 5, than in the case where two or more dummy illuminations are provided before the non-illumination exposure and two or more dummy illuminations are provided after the non-illumination exposure.

Operation Example 2

While the pulsed illumination is output in operation example 1, the present invention is not limited to this. The waveform of the illumination may have any shapes.

Figure 6:
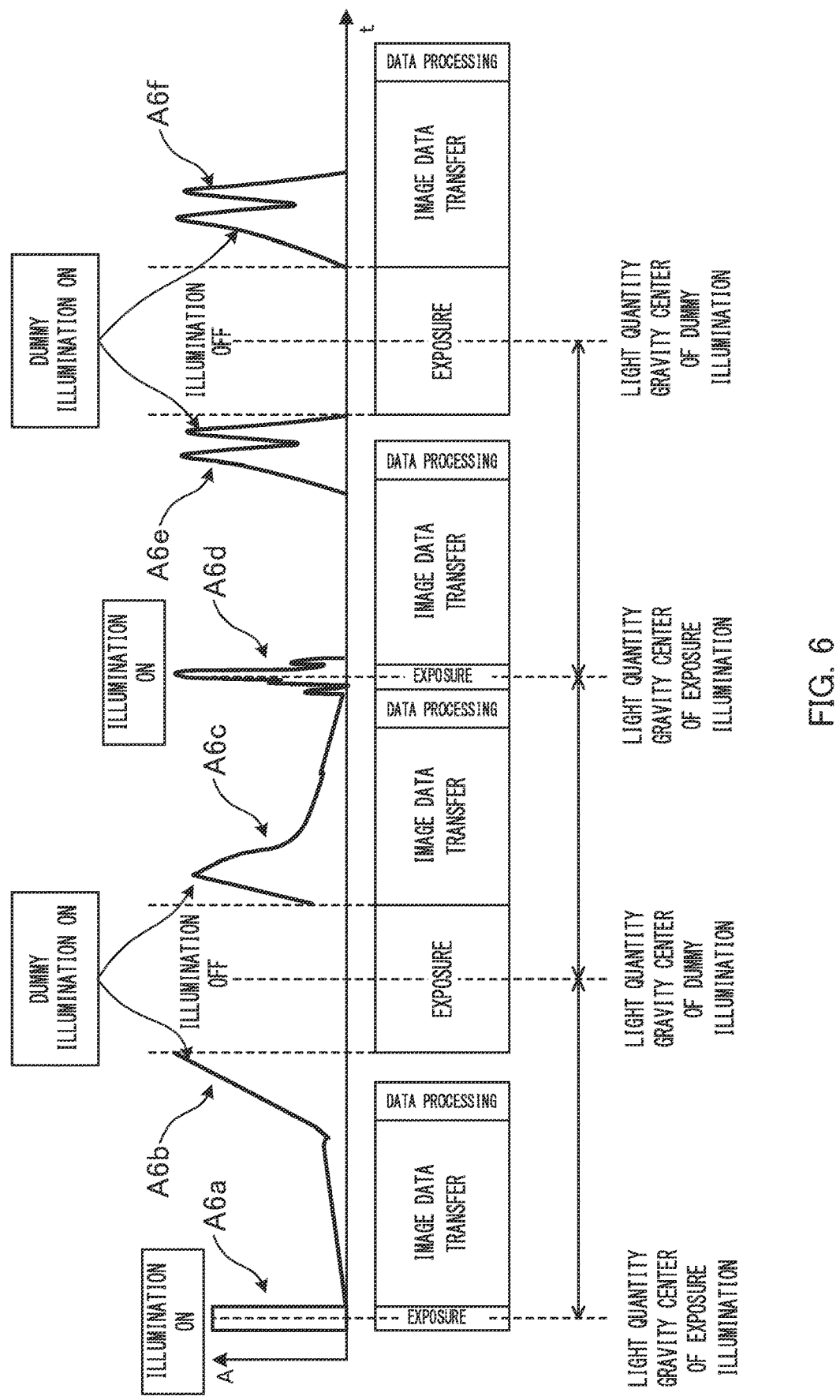
FIG. 6 is a diagram illustrating operation example 2 of the code scanner.

FIG. 6 is a diagram illustrating operation example 2 of code scanner 100. As described in operation example 1, processor 122 controls the on time and light quantity of LED 113 such that the gravity center of the light quantity of the exposure illumination and the gravity center of the light quantity of the dummy illumination alternate at even intervals. In this manner, the discomfort due to the flicker of the illumination is suppressed.

Therefore, as long as the on time and light quantity of LED 113 are controlled such that the gravity center of the light quantity of the exposure illumination and the gravity center of the light quantity of the dummy illumination alternate at even intervals, the waveform of the light quantity of the light output from LED 113 may have any shapes as illustrated in FIG. 6. Specifically, code scanner 100 can control in a flexible manner the profiles of the exposure illumination and the dummy illumination (the light quantity in time series, i.e., the waveform of the light quantity). For example, as indicated by arrows A6a to A6f in FIG. 6, the profiles of the exposure illumination and the dummy illumination may be different from each other.

Note that there is a blank between the data processing and the non-illumination exposure in FIG. 6, and processor 122 may calculate the profiles of the exposure illumination and the dummy illumination in this blank period. In the case where processor 122 does not calculate the profiles of the exposure illumination and the dummy illumination, the blank from the non-illumination exposure may not be provided. The same applies to operation example 1 described in FIG. 5.

Operation Example 3

While the dummy illumination is output before and after the non-illumination exposure in operation example 1 and operation example 2, the present invention is not limited to this. The dummy illumination may be output before the non-illumination exposure without being output after the non-illumination exposure.

Figure 7:
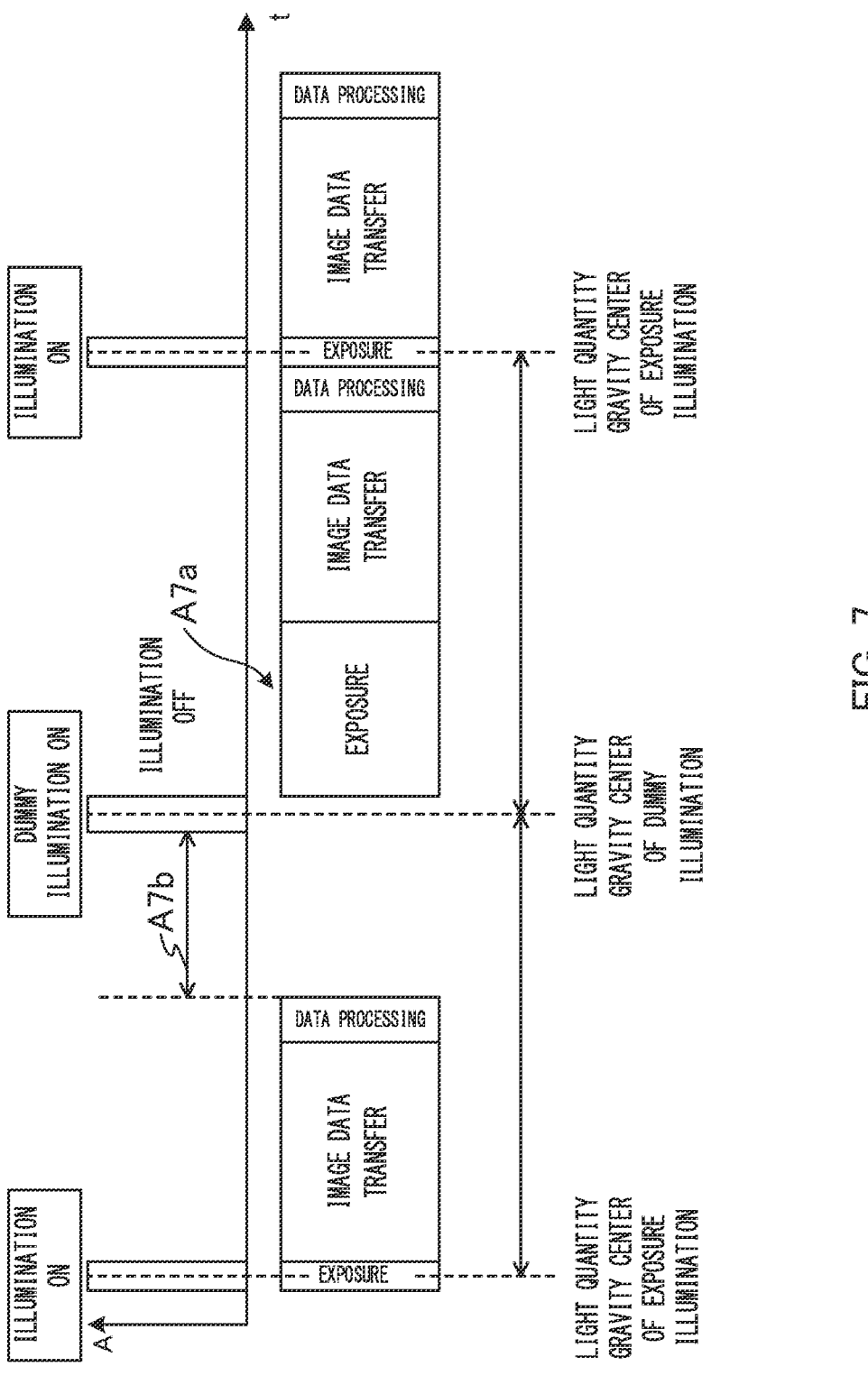
FIG. 7 is a diagram illustrating operation example 3 of the code scanner.

FIG. 7 is a diagram illustrating operation example 3 of code scanner 100. Processor 122 turns on the dummy illumination before the non-illumination exposure indicated by arrow A7a in FIG. 7. As described in operation examples 1 and 2, processor 122 controls the on time and light quantity of LED 113 such that the gravity center of the light quantity of the exposure illumination and the gravity center of the light quantity of the dummy illumination alternate at even intervals. For example, as indicated by arrow A7b in FIG. 7, processor 122 controls the on time of LED 113 after a delay of a predetermined time (such that the gravity center of the light quantity of the exposure illumination and the gravity center of the light quantity of the dummy illumination alternate at even intervals) after the data processing of the optical code.

In this manner, processor 122 may output the dummy illumination before the non-illumination exposure. Also in this case, processor 122 controls the on time and light quantity of LED 113 such that the gravity center of the light quantity of the exposure illumination and the gravity center of the light quantity of the dummy illumination alternate at even intervals, and thus the discomfort due to the flicker of the illumination is suppressed. In addition, the power consumption of code scanner 100 is suppressed.

Verification

Figures 8A, 8B, 8C:
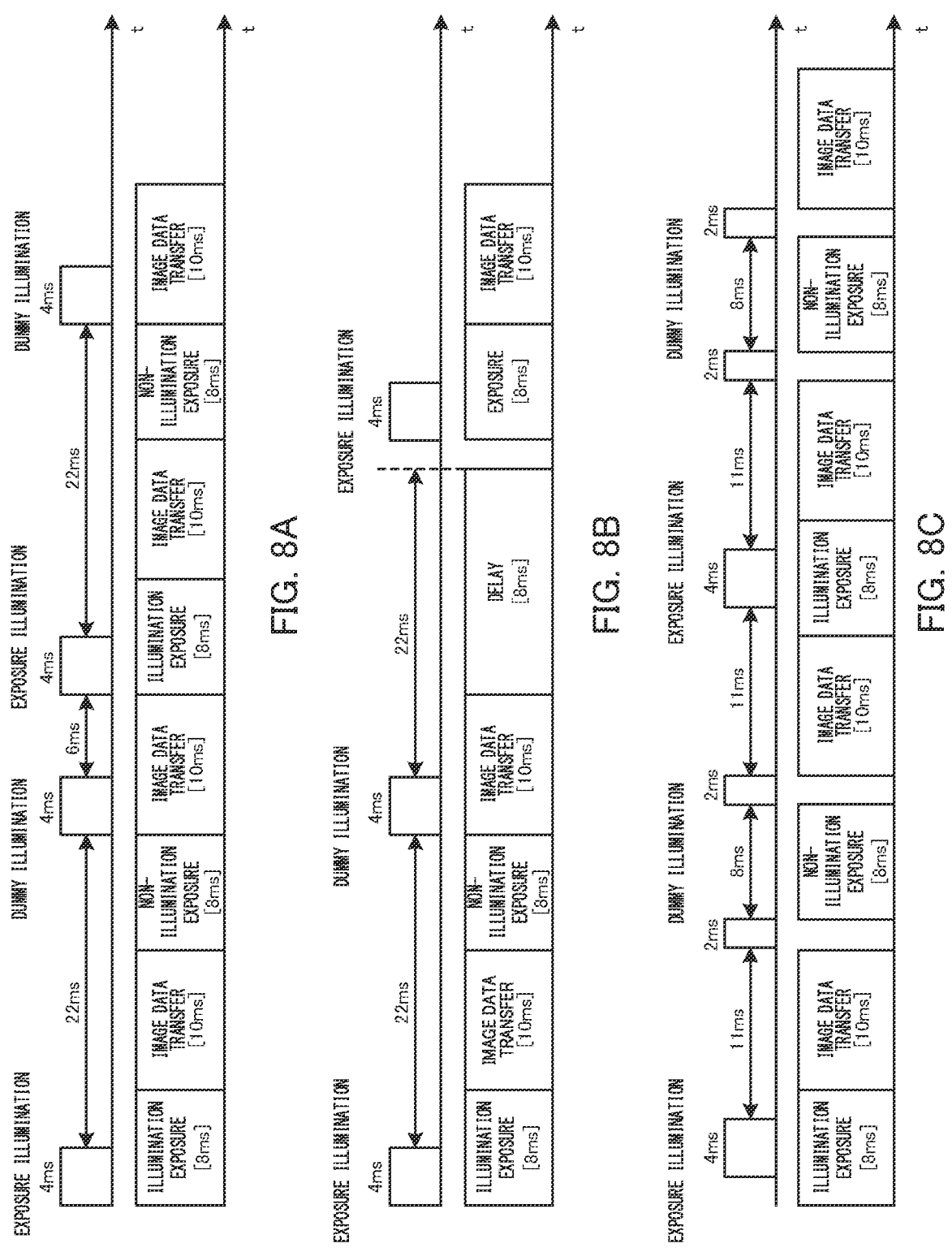
FIGS. 8A to 8C are diagrams illustrating verification of blink of illumination.

FIGS. 8A to 8C are diagrams illustrating verification of flicker of illumination. FIG. 8A is a timing diagram of the model of FIG. 4. Specifically, FIG. 8A is a timing diagram of a code scanner that is controlled to output the dummy illumination but not controlled such that the gravity center of the light quantity of the exposure illumination and the gravity center of the light quantity of the dummy illumination alternate at even intervals.

FIG. 8B is a timing diagram of a code scanner in a case where the dummy illumination is output after the non-illumination exposure.

FIG. 8C is a timing diagram of code scanner 100. Specifically, FIG. 8C is a timing diagram of code scanner 100 that controls the outputs of the exposure illumination and the dummy illumination such that the gravity center of the light quantity of the exposure illumination and the gravity center of the light quantity of the dummy illumination alternate at even intervals.

In the verification of FIGS. 8A to 8C, the time of the illumination exposure and the non-illumination exposure was set to 8 ms. The time of the image data transfer of the non-illumination exposure was set to 10 ms. In FIG. 8A and FIG. 8B, the time of the exposure illumination and the dummy illumination was set to 4 ms. In FIG. 8C, the time of the exposure illumination was set to 4 ms, and the time of the dummy illumination was set to 2 ms. In FIG. 8A, the interval of the exposure illumination and the dummy illumination was set to 22 ms and 6 ms. In FIG. 8B, the interval of the exposure illumination and the dummy illumination was set to 22 ms. In FIG. 8C, the interval of the exposure illumination and the dummy illumination was set to 11 ms, and the interval of the dummy illumination was set to 8 ms.

In the timing diagrams of FIG. 8A and FIG. 8B, flicker of illumination was visually recognized. Conversely, in the timing diagram of FIG. 8C, no flicker of illumination was visually recognized. That is, in code scanner 100 of the present disclosure, no flicker of illumination was visually recognized.

Overview of Embodiments

As described above, CMOS 112 repeats the illumination exposure and the non-illumination exposure, and processor 122 controls LED 113 such that the gravity center of the light quantity of the exposure illumination at the time of the illumination exposure and the gravity center of the light quantity of the dummy illumination before and after the non-illumination exposure or before the non-illumination exposure are at even time intervals. In this manner, the flicker of the illumination captured in the human eye is suppressed, and discomfort is suppressed.

The embodiments are described above. While a case where a code scanner is used as an optical information reading apparatus is described above, the present disclosure may be applied to a case where other optical information reading apparatuses are used. In the specification, "same" may encompass "substantially the same". The "center" may encompass "approximate center". The "at even intervals" may encompass "at substantially even intervals". The "exposure" may be read as "image-capturing". Processor 122 may control at least one of the on time and light quantity of LED 113 such that the gravity center of the light quantity of the exposure illumination and the gravity center of the light quantity of the dummy illumination are at even time intervals.

The hardware configuration example of FIG. 1 is merely an example, and the configuration example of FIG. 1 is not limitative. For example, first I/O 121 and second I/O 125 may be included in processor 122. For example, the storage means such as RAM 123 and ROM 124 may be included in processor 122. In addition, the means for achieving the functions described in operation examples 1 to 3 is not limited to processors and the like, but may be dedicated circuits. For example, the functions of optical head part 110 and decoder part 120 may be achieved by devices such as an FPGA (Field Programmable Gate Array).

INDUSTRIAL APPLICABILITY

The present disclosure is suitable for an optical information reading apparatus and an optical information reading method for reading optical codes.

REFERENCE SIGNS LIST

100 Code scanner
110 Optical head part
111 Lens
112 CCD

113 LED
120 Decoder part
121 First I/O
122 Processor
123 RAM
124 ROM
125 Second I/O

The invention claimed is:

1. An optical information reading apparatus comprising:
a light source;
an imaging element configured to repeat a first exposure and a second exposure; and
a control part configured to control the light source such that a gravity center of a light quantity of exposure illumination at a time of the first exposure and a gravity center of a light quantity of dummy illumination before and after the second exposure or before the second exposure are at an even time interval,
wherein the control part is further configured to turn off the light source during the second exposure, and
wherein the control part is further configured to control the light source such that a time interval between successive illuminations of the light source is at an uneven time interval.

2. The optical information reading apparatus according to claim 1, wherein the control part is further configured to control the light source such that a total amount of the light quantity of the exposure illumination and a total amount of the light quantity of the dummy illumination are equal to each other.

3. The optical information reading apparatus according to claim 1, wherein the control part is further configured to control the light source such that a light quantity waveform of the exposure illumination of the first exposure differs between before and after the second exposure.

4. The optical information reading apparatus according to claim 1, wherein the control part is further configured to control the light source such that a light quantity waveform of the dummy illumination differs between before and after the second exposure.

5. The optical information reading apparatus according to claim 1, wherein the control part is further configured to control at least one of a light quantity and on time of the light source.

6. An optical information reading method comprising:
repeating a first exposure and a second exposure;
controlling a light source such that a gravity center of a light quantity of exposure illumination at a time of the first exposure and a gravity center of a light quantity of dummy illumination before and after the second exposure or before the second exposure are at an even time interval;
turning off the light source during the second exposure; and
controlling the light source such that a time interval between successive illuminations of the light source is at an uneven time interval.

* * * * *